US011895350B2

(12) United States Patent
Fieldhouse et al.

(10) Patent No.: US 11,895,350 B2
(45) Date of Patent: Feb. 6, 2024

(54) TECHNIQUES FOR PROVIDING A CONTENT STREAM BASED ON A DELIVERED STREAM OF CONTENT

(71) Applicant: Nagravision Sàrl, Cheseaux-sur-Lausanne (CH)

(72) Inventors: Patricia Fieldhouse, Weston-Super-Mare (GB); Ben Lavery-Griffiths, Cheseaux-sur-Lausanne (CH); David Price, Cheseaux-sur-Lausanne (CH)

(73) Assignee: NAGRAVISION SARL, Cheseaux-sur-Lausanne (CH)

( * ) Notice: Subject to any disclaimer, the term of this patent is extended or adjusted under 35 U.S.C. 154(b) by 0 days.

(21) Appl. No.: 17/789,794

(22) PCT Filed: Dec. 30, 2020

(86) PCT No.: PCT/EP2020/088065
§ 371 (c)(1),
(2) Date: Jun. 29, 2022

(87) PCT Pub. No.: WO2021/136823
PCT Pub. Date: Jul. 8, 2021

(65) Prior Publication Data
US 2023/0038275 A1    Feb. 9, 2023

(30) Foreign Application Priority Data

Dec. 30, 2019 (EP) .................................... 19220006

(51) Int. Cl.
*H04N 21/845* (2011.01)
*H04N 21/262* (2011.01)

(52) U.S. Cl.
CPC ... *H04N 21/26241* (2013.01); *H04N 21/8456* (2013.01)

(58) Field of Classification Search
None
See application file for complete search history.

(56) References Cited

U.S. PATENT DOCUMENTS 9,794,360 B1 * 10/2017 Farhangi ............... H04L 65/612
2003/0093790 A1 * 5/2003 Logan ................. G06F 16/7867
                                                                    348/E7.071
(Continued)

FOREIGN PATENT DOCUMENTS

AU        2015202846 A1      1/2016
CN         106789956 A       5/2017
WO    WO-2013077047 A1 *    5/2013    ......... H04N 21/2387

*Primary Examiner* — William J Kim
(74) *Attorney, Agent, or Firm* — POLSINELLI LLP

(57) ABSTRACT

A method of providing a content stream based on capturing an initial delivery of the content stream. The method comprises obtaining manifest data related to the initial delivery of the content stream, the manifest data being obtained one or more times in a sequence during the initial delivery of the content stream to generate one or more manifest files; associating a time-stamp with each of the manifest files, the time stamp being indicative of a time of obtaining the associated manifest file; processing each of the manifest files to identify one or more addresses referenced in the manifest file of one or more segments comprising a portion of the content stream in the initial delivery; accessing one or more of the segments identified via the one or more addresses referenced in the manifest files; modifying a last one of the manifest files to include at least a portion of an earlier manifest file of the manifest files; and providing a client with access to the manifest files including the modified last manifest file and the accessed one or more segments, thereby enabling the client to receive at least a portion of the content stream.

20 Claims, 7 Drawing Sheets

(56) References Cited

U.S. PATENT DOCUMENTS

| | | | |
|---|---|---|---|
| 2011/0080940 A1* | 4/2011 | Bocharov | H04N 21/4348 375/240.01 |
| 2011/0096828 A1* | 4/2011 | Chen | H04N 21/8456 375/E7.126 |
| 2011/0125919 A1* | 5/2011 | Kwon | H04N 21/2353 709/231 |
| 2012/0047542 A1* | 2/2012 | Lewis | H04N 21/44016 725/97 |
| 2012/0278497 A1* | 11/2012 | Hsu | H04N 21/26258 709/231 |
| 2013/0282915 A1* | 10/2013 | Patel | H04L 65/60 709/231 |
| 2014/0189761 A1 | 7/2014 | Sood et al. | |
| 2014/0230003 A1* | 8/2014 | Ma | H04N 21/4147 725/115 |
| 2015/0127845 A1 | 5/2015 | Phillips et al. | |
| 2015/0215359 A1 | 7/2015 | Bao et al. | |
| 2016/0269801 A1 | 9/2016 | Harden et al. | |
| 2017/0171577 A1* | 6/2017 | Kipp | G11B 27/10 |
| 2017/0332113 A1* | 11/2017 | Haritaoglu | H04N 21/23418 |
| 2017/0353516 A1 | 12/2017 | Gordon | |
| 2018/0234714 A1* | 8/2018 | Johns | G06F 16/172 |
| 2019/0182554 A1 | 6/2019 | Schupak et al. | |
| 2019/0246158 A1* | 8/2019 | Martell | H04N 21/8456 |
| 2019/0246159 A1* | 8/2019 | Martell | H04N 21/2668 |
| 2019/0327505 A1* | 10/2019 | Schwimmer | H04N 21/23106 |
| 2020/0076882 A1* | 3/2020 | Parekh | H04L 67/02 |
| 2020/0267436 A1* | 8/2020 | Martell | H04N 21/2187 |

\* cited by examiner

TECHNIQUES FOR PROVIDING A CONTENT STREAM BASED ON A DELIVERED STREAM OF CONTENT

TECHNICAL FIELD

The present disclosure relates to techniques (e.g., systems, methods, or devices) for capturing delivery of a content stream and techniques for providing the content stream based on previous delivery of the content stream.

BACKGROUND

Dynamic Adaptive Streaming over HTTP (DASH) has become more popular for streaming media content over the Internet from a conventional HTTP web server. DASH is specified in standard ISO/IEC 23009-1:2014, also referred to as Moving Picture Experts Group-Dynamic Adaptive Streaming over HTTP or MPEG-DASH.

MPEG-DASH uses an adaptive bitrate streaming technique to adapt the streamed content to the current network conditions. The media content is broken into a sequence of small files called segments, each segment containing a short interval of playback time. Each segment is encoded at a variety of different bit rates or spatial resolutions, so that the alternative versions of a segment include the same content and cover the same aligned short interval of playback time but can be delivered at different bit rates. During playback, the MPEG-DASH client playing the streamed content automatically selects the next segment to download from the alternative segments based on current network conditions. This enables the client to select the segment with the highest bit rate segment that can be downloaded in time for playback without causing stalls or re-buffering during the playback.

The MPEG-DASH standard defines a manifest file, called a media presentation description (MPD), which provides information about the media segments which comprise the media content of the stream. This information includes timing information and media characteristics such as video resolution and bit rates for the segments, and a uniform resource identifier (URI) where each segment can be accessed.

During delivery (e.g., transmission) of a stream of content (e.g., live content), the manifest and segments are generated on-the-fly by the MPEG-DASH server as the content becomes available. The resulting stream is typically available during a specified period of availability, each segment being specified with an availability start time and an availability end time. It is useful to be able to capture and replay a stream for various purposes. For example, debugging client playback issues encountered during a live stream can be difficult if the equipment setup originally used to generate the stream is not available to regenerate the live stream for debugging. As another example, monitoring the quality of a stream delivery can be more easily accomplished if the stream can be reproduced at a later time.

However, simply capturing delivery of a stream may not enable the captured content to be restreamed. At the time of redelivering the stream, the content of the original transmission may no longer be available for access by a client to replay the stream. In addition, an adaptive bitrate streaming technique may not enable redelivery of a stream unless the content of the original delivery is captured at multiple bit rates or the content is encoded again at multiple bit rates for restreaming. Furthermore, to facilitate testing and debugging of equipment and systems to support delivery of content, it is useful to be able to deliver a previous delivery of content for as long as necessary to complete the testing or debugging, even if this is a longer period than the length of the original delivery.

SUMMARY

The present disclosure proposes a system and method for providing a content stream based on capturing an initial delivery of the content stream. According to an aspect of this disclosure the method comprises obtaining manifest data related to the initial delivery of the content stream, the manifest data being obtained one or more times in a sequence during the initial delivery of the content stream to generate one or more manifest files; associating a timestamp with each of the one or more manifest files, the time stamp being indicative of a time of obtaining the associated manifest file; processing each of the one or more manifest files to identify one or more addresses referenced in the manifest file of one or more segments comprising a portion of the content stream in the initial delivery; accessing one or more of the segments identified via the one or more addresses referenced in the manifest files; modifying a last manifest file of the one or more manifest files to include at least a portion of an earlier manifest file of the one or more manifest files; and providing a client with access to the one or more manifest files including the modified last manifest file and the accessed one or more segments, thereby enabling the client to receive at least a portion of the content stream.

The method may further comprise storing each of the one or more manifest files to a location for enabling the client to access the stream for presentation of the content.

In one embodiment, the second or later obtained manifest files may be obtained after expiration of at least a predetermined time delay, where the predetermined time delay is a delay from a time of obtaining a last previously obtained manifest file.

In one embodiment, the accessing of the one or more of the segments is attempted for all of the one or more segments referenced by the addresses. In one embodiment, accessing of the one or more of the segments may be attempted for segments meeting a predetermined criteria, e.g. so that it is determined if the predetermined criteria is met before accessing the segments.

In one embodiment, the method further comprises storing the accessed one or more segments, and editing one or more of the manifest files to refer to one or more new addresses of the stored segments.

In one embodiment, the step of modifying a last manifest file comprises copying a first period from an earlier manifest file and inserting the copied period as a second or later period of the last manifest file.

In one embodiment, the method further comprises processing each manifest file to identify an availability time for each of the identified segments, and attempting access of the identified segments before expiration of the availability time of the corresponding segments. In one embodiment, each of the one or more segments have an associated availability period, and the processing each of the manifest files is performed during the availability period of the respective segments. In one embodiment, the method further comprises editing the one or more manifest file to change one or more availability time indications in the manifest file.

According to another aspect, a system is proposed for providing a content stream based on capturing an earlier delivery of the content stream. The system comprises a manifest data access unit and a processing unit. The manifest data access unit is adapted to obtain manifest data related to the earlier delivery of the content stream, the manifest data being obtained one or more times in a sequence during the earlier delivery of the content stream to generate one or more manifest files. The system is adapted to associate a timestamp with each of the one or more manifest files, the time stamp being indicative of a time of obtaining the associated manifest file; process each of the one or more manifest files to identify one or more addresses referenced in the manifest file of one or more segments comprising a portion of the content stream in the earlier delivery; access one or more of the segments identified via the one or more addresses referenced in the manifest files; and modify a last manifest file of the one or more manifest files to include at least a portion of an earlier manifest file of the one or more manifest files. The system is adapted to provide a client with access to the one or more manifest files including the modified last manifest file and the accessed one or more segments, the access enabling the client to receive at least a portion of the content stream.

In one embodiment the system is further adapted to save each of the one or more manifest files to a location for download to the client to enable the client to play the content stream. In one embodiment, any second or later obtained manifest files are obtained after expiration of at least a predetermined time delay after obtaining a last previously obtained manifest file. In one embodiment the step of modifying a last manifest file may comprise copying a first period from an earlier manifest file and inserting the copied period as a second or later period of a last copy of the manifest file.

The system may be further adapted to process each manifest file to identify an availability time for each of the identified segments, and attempt download of the identified segments only during an availability time of the corresponding segments.

The disclosure provides a number of advantages. It enables efficient capture of the manifest data which is edited on-the-fly by the content stream server during the stream delivery, and enables capture of the complete set, or a selected subset, of the original encoded content segments of the delivery. This enables the generation of a looping stream retransmission to avoid problems caused by a discontinuity in the content stream, and facilitate applications such as testing or debugging where a content stream which is continuously running for an extended period is necessary. And it enables retransmission of a live stream transmission, by effectively recreating the same conditions as the original transmission, enabling for example more efficient testing and debugging of problems experienced during the original transmission. These advantages are explained further below.

BRIEF DESCRIPTION OF DRAWINGS

Embodiments will now be described, by way of example only, with reference to the accompanying schematic drawings in which corresponding reference symbols indicate corresponding parts, and in which.

The drawings are intended for illustrative purposes only, and do not serve as restriction of the scope or the protection as laid down by the claims.

DESCRIPTION OF EMBODIMENTS

The following is a description of certain embodiments. Note that the term "delivery" is used herein to include any means of communication of media or information content, for example by one or more network servers, in a format which allows a client to access a stream of the content, including manifest information and media content segments relating to the content delivered. Delivery of content may include transmission or broadcast of the content, and certain embodiments described herein refer to transmission or broadcast of content. However, the concepts and embodiments described herein are not limited to any particular means of delivery, and other forms of communication of the content may also be used for any of the embodiments described.

The disclosure provides techniques (e.g., systems, methods, and apparatuses) for capturing a streamed delivery of content and serving the content at a later time, e.g. restreaming a transmission at a later time than the earlier transmission.

Figure 1:
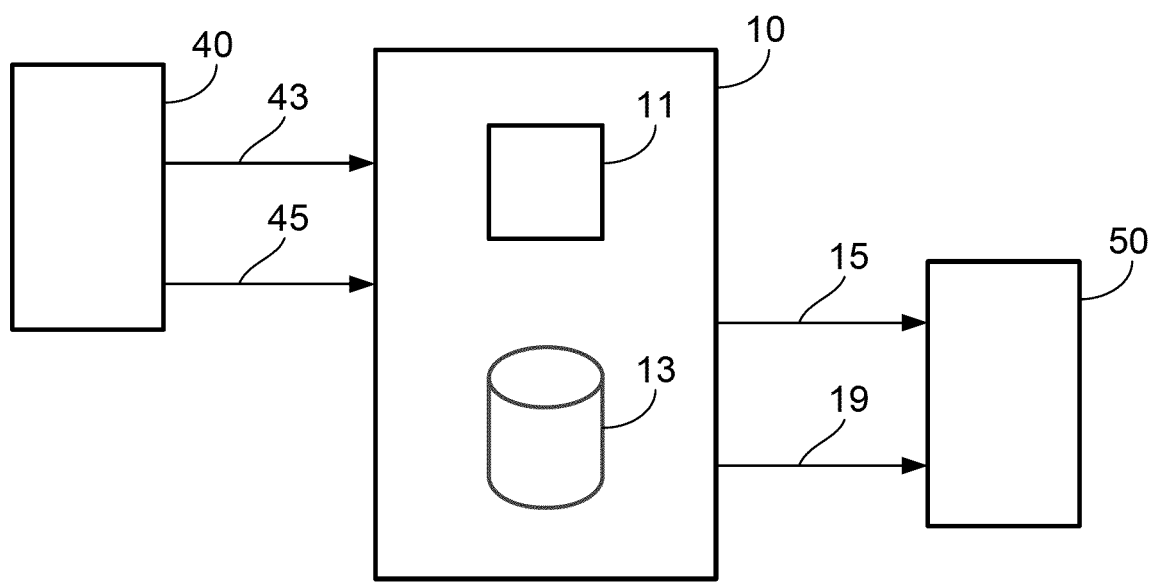
FIG. 1 shows a simplified block diagram of a system for providing a content stream based on a previous delivery of the content stream according to an exemplary embodiment of this disclosure.

The embodiment shown in FIG. 1 comprises a system 10 for providing a stream of content based on an earlier transmission of the content. The system 10 is in communication with a computer system 40 which may comprise one or more servers, e.g. arranged to form a content delivery network, and from which the system 10 may receive the content stream 45 and a manifest data access 43 for the content stream. The system 10 comprises a processing unit 11 for processing the manifest data and the content stream, and a data storage unit 13 for storing data files relating to the manifest data and content stream. The system 10 is adapted to provide a client 50 with access to the processed manifest data and the content stream, to enable the client to receive the manifest data 15 and the content stream 19.

For the earlier transmission, the computer system 40 operates as the provider of the content stream in co-operation with the system 10 which operates as a client, requesting content and service from the computer system 40 which services those requests. For the retransmission, the system 10 operates as the provider of the captured content in co-operation with the client 50 which requests content and service from the system 10 which services those requests. The client and server for both the earlier transmission and the retransmission may comprise separate units communicating over a computer network such as the internet, or both client and server may reside in the same system.

The system 10 may be used for capturing a transmission of a content stream 45 and retransmitting the captured content stream. In particular, the system 10 may be adapted for capturing a content stream. In addition, the system 10 may be adapted for processing the captured content stream to permit restreaming of the captured content at a later time. Furthermore, the system 10 may be adapted for restreaming the captured content in a manner to reproduce the captured content stream. A live stream (or content stream) as described herein is not limited to delivery (e.g., streaming) of an event in real-time, or "live," as the event happens, but also comprises any content stream which is progressively encoded for transmission during the transmission. Furthermore, although the techniques are described herein in the context of a live stream, the disclosure is not limited to this and the system and method may also find application for processing and transmission of content which does not derive from a live stream.

The system 10 is applicable for one or more different types of content delivery protocols or formats, such as a streaming protocol. Examples of streaming protocols may include, without limitation, MPEG-DASH, Apple HTTP Live Streaming (HLS), Microsoft Smooth Streaming, and Adobe HTTP Dynamic Streaming (HDS) among others. Manifest data (e.g., an MPEG-DASH manifest file) of a streaming protocol has a hierarchical structure. The manifest data may be organized in one or more sections (e.g. periods), where each section includes information for a certain time interval of the stream. Each section typically has a starting time and duration and may consist of one or multiple adaptation sets. Each adaptation set may include information about the various encoded alternative segments for the section or period, for one (or more) of the media components of the stream, e.g. one adaptation set may comprise information about the video segments, and one adaptation set may comprise information about the audio segments. Each adaptation set usually contains multiple representations, where each representation is an encoded alternative of the same media component over the same period, varying from other representations by bit rate, resolution, number of channels, or some other characteristic. Each representation consists of one or multiple segments, where each segment provides a start time and uniform resource identifier (URI), i.e. an addressable location on a server from which the corresponding segment of media content can be accessed (e.g., downloaded or retrieved) by a client.

Figure 2:
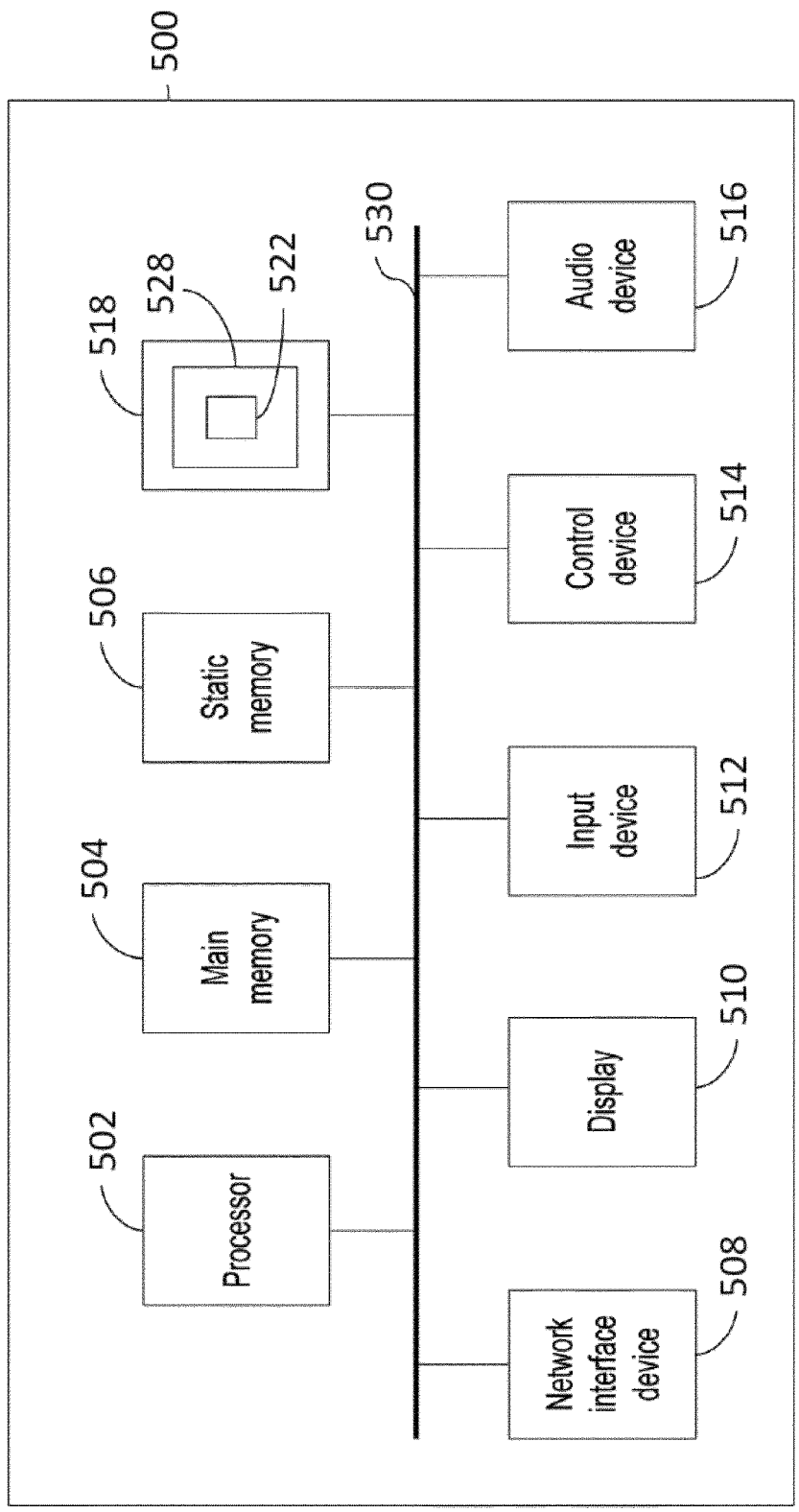
FIG. 2 shows a simplified block diagram of a computing device that may be used for implementation of components in any of the embodiments.

The system 10, computer system 40, and client 50, and components and elements of these systems, may be implemented as a computing device 500 shown in FIG. 2. FIG. 2 illustrates a block diagram of one implementation of a computing device 500 within which a set of instructions, for causing the computing device to perform any one or more of the techniques or methods described herein, may be executed. The computing device 500 may be used for elements of the embodiments shown in FIGS. 1 and 3.

In alternative implementations, the computing device may be connected (e.g., networked) to other machines in a Local Area Network (LAN), an intranet, an extranet, or the Internet. The computing device may operate in the capacity of a server or a client machine in a client server network environment, or as a peer machine in a peer-to-peer (or distributed) network environment.

The computing device may be a personal computer (PC), a tablet computer, a set-top box (STB), a wearable computer system, a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a secondary memory (e.g., a data storage device 518), which communicate with each other via a bus 530.

Processing device 502 represents one or more general-purpose processors such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the processing logic (instructions 522) for performing the operations and steps discussed herein.

The computing device 500 may further include a network interface device 508. The computing device 500 also may include a video display unit 510 (e.g., a liquid crystal display (LCD) or a cathode ray tube (CRT)), an alphanumeric input device 512 (e.g., a keyboard or touchscreen), a cursor control device 514 (e.g., a mouse or touchscreen), and an audio device 516 (e.g., a speaker).

The data storage device 518 may include one or more machine-readable storage media (or more specifically one or more non-transitory computer-readable storage media 528) on which is stored one or more sets of instructions 522 embodying any one or more of the methodologies or functions described herein. The instructions 522 may also reside, completely or at least partially, within the main memory 504 and/or within the processing device 502 during execution thereof by the computing device 500, the main memory 504 and the processing device 502 also constituting computer-readable storage media.

The various methods described herein may be implemented by a computer program. The computer program may include computer code arranged to instruct a computer to perform the functions of one or more of the various methods described herein. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein (for example the processing unit 11 of FIG. 1 and/or the manifest capture unit 12, segment capture unit 16, and/or manifest data edit unit 20 of FIG. 3) can be implemented as discrete components or integrated in the functionality of hardware components such as ASICS, FPGAs, DSPs or similar devices as part of an individualization server.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations. Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Figure 3:
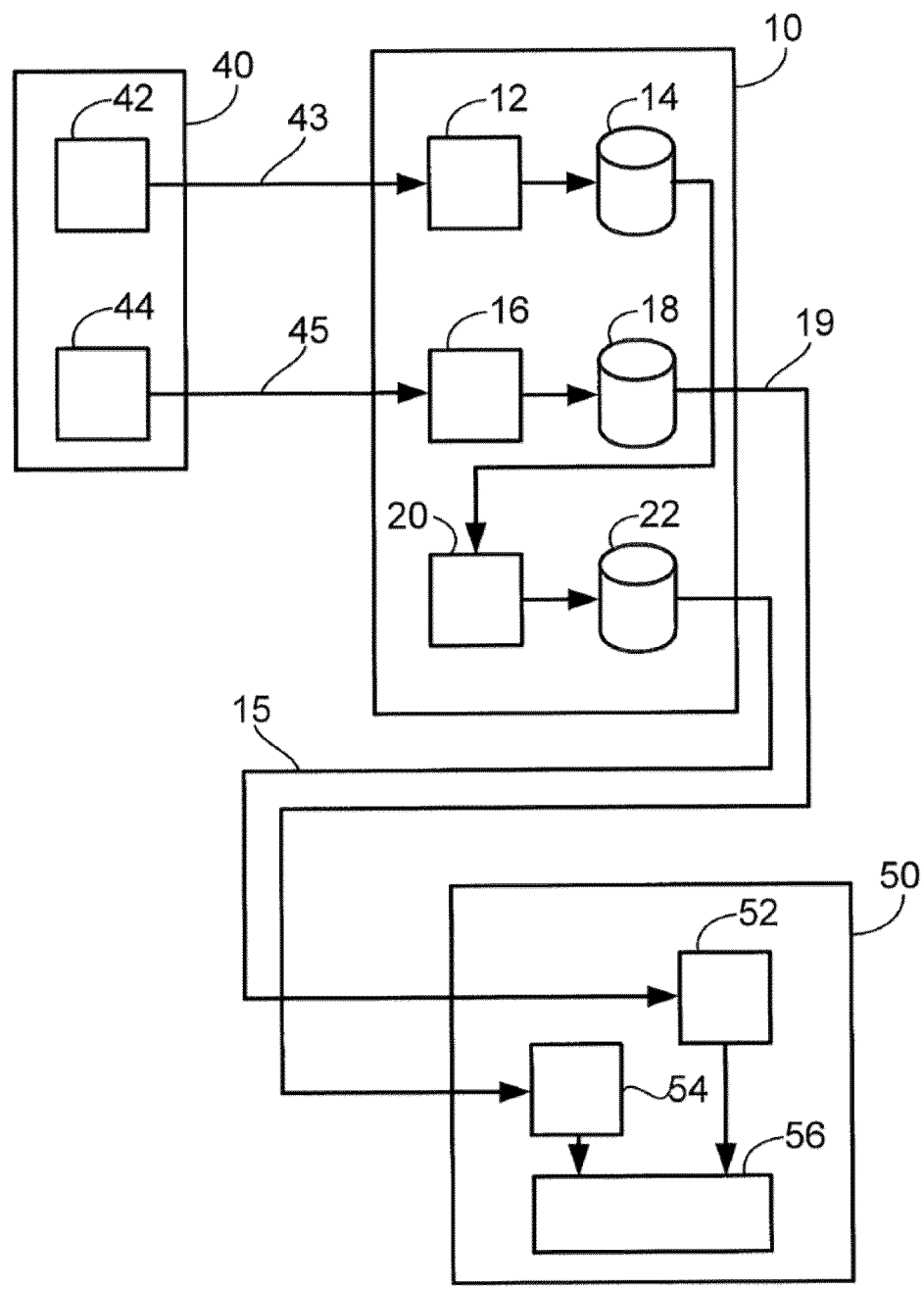
FIG. 3 shows an embodiment of the system of FIG. 1 showing additional details of the system.

The embodiment shown in FIG. 3 comprises a system 10 for providing a content stream based on an earlier transmission of the content stream, in which the processing unit 11 of FIG. 1 comprises a manifest capture unit 12, segment capture unit 16, and manifest data edit unit 20, and in which the data storage unit 13 of FIG. 1 comprises a captured manifest data storage unit 14, captured segment storage unit 18, and restream manifest data storage unit 22.

The system 10 and the system's units are typically implemented as programmable computer devices which comprise one or more processors, memory, data storage such as magnetic disks or flash memory storage, input/output circuitry, programmable hardware, and/or hardware logic, connected via one or more communication buses, together with computer program code and/or instructions executed from the memory on the processor(s) for performing the functions described herein. Each system and unit described herein may be implemented as one or more separate devices or combined into one or more integrated devices, and each of the functions performed by the system and units may be implemented as one or more separate functions or two or more of the functions may be combined. For example, the content stream server 40, system 10, and client 50 may be separate devices or one or all of them may be integrated together, and they may be implemented in a content delivery network or other network-based or cloud-based implementation. The system 10 or parts of the system 10 may be implemented in a wide variety of devices such as a mobile phone, tablet computer, set-top box, television, personal computer, network server, or other suitable device.

The system 10 operates to capture a content stream transmitted from a content stream server 40, and manipulating the captured content stream to permit restreaming of the captured content to a client 50 at a later time.

The computer system 40 may generate and store manifest data 42 and content stream segments 44 during delivery of a stream for presentation. The computer system 40 may be configured to provide a live content stream, for example one using an adaptive bitrate streaming technique, such as Moving Picture Experts Group-Dynamic Adaptive Streaming over HTTP (MPEG-DASH), Apple HTTP Live Streaming (HLS), Microsoft Smooth Streaming, and Adobe HTTP Dynamic Streaming (HDS) among others.

The content stream segments 44 contain the content of the stream, e.g. video and audio information, encoded in segments, each containing content for a short interval of playback time. The content for each interval of playback time, is preferably encoded in segments containing alternative versions of the same content but encoded at one or more bit rates, one or more resolutions, one or more number of channels, or some other characteristic or attribute, which allows the content for that interval of playback time to be delivered to a client 50 according to those characteristics or attributes (e.g., different bit rates). The manifest data 42 contains information to be used by the client 50 to select from the content stream segments 44 to play the content stream transmission.

The client 50 may be of a conventional design, which operates to receive the content stream. The client 50 may comprise software executing on a computer processor or may comprise a dedicated client server device, and may be implemented in a suitable end-user device such as a mobile phone, computer, set-top box, television, etc., or be implemented as a network or cloud-based client receiving the content stream from system 10 and communicating to an end-user's device. In some embodiments, the client 50 may be integrated into the system 10. In some embodiments, the client 50 may be a live streaming client, for example the Google Shaka player, VLC Media Player, or other live streaming client, and the client 50 may support the MPEG-DASH live streaming, or may be a web browser or media player supporting MPEG-DASH or other streaming service.

The client 50 may comprise one or more facilities for retrieving a content stream transmission from the system 10. In the illustrated embodiment, the client 50 comprises manifest data parser 52, segment parser 54, and media player 56.

In this embodiment, the client 50 accesses the manifest data from the restream manifest data storage unit 22. The manifest data parser 52 parses the accessed (e.g., downloaded or retrieved) manifest data and selects the set of segments it can use based on the information in the manifest data, the capabilities of the client, the choices of its user, and the prevailing network conditions. The client 50 then starts accessing (e.g., downloading) the selected segments and the segment parser 54 parses the segments to extract video and audio information which is passed to the media player 56 to play the content stream.

The flowcharts shown in FIGS. 4-7 illustrate steps that may be implemented in the system 10 in some embodiments of this disclosure.

Figure 4:
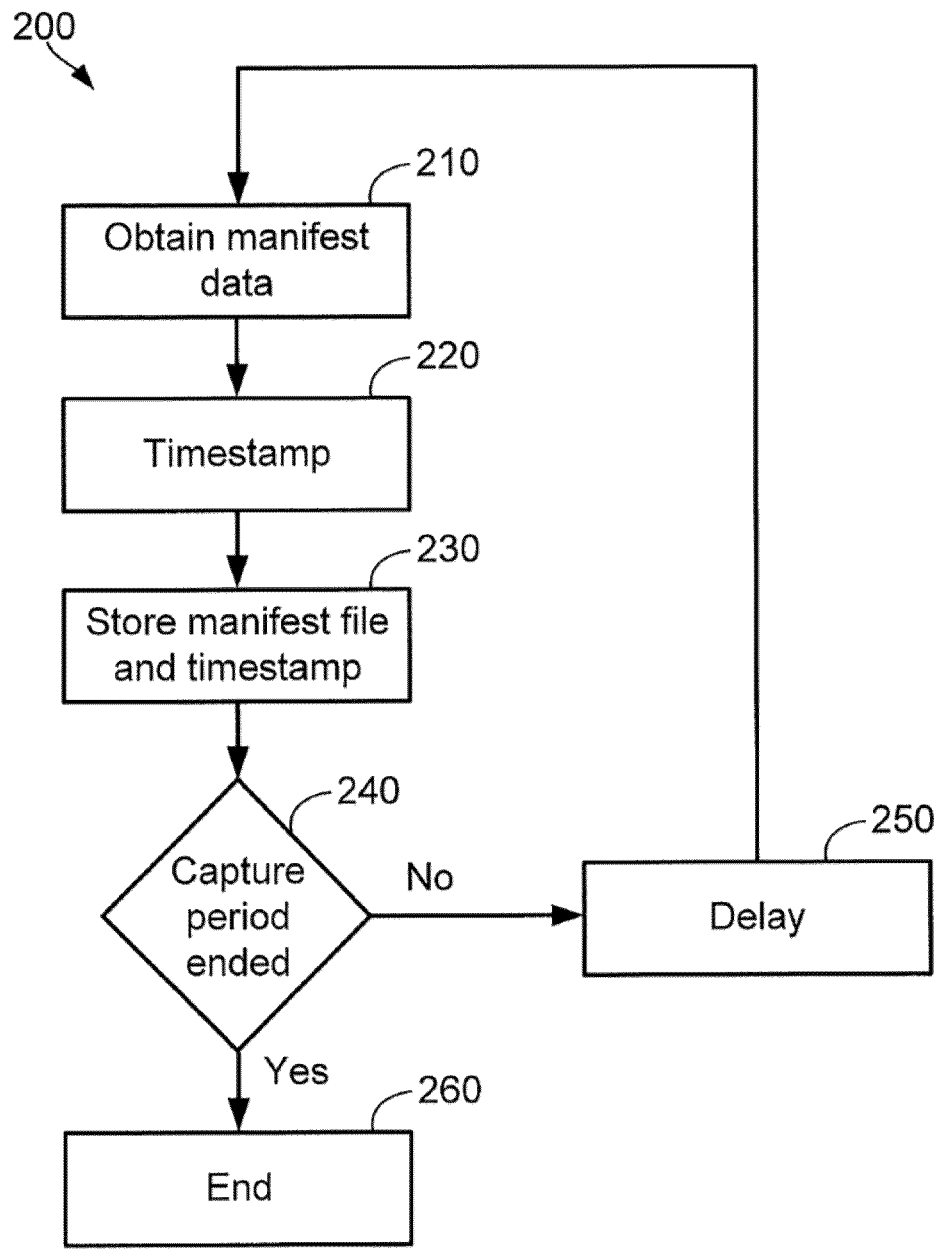
FIG. 4 shows a flow diagram of a method for capture of manifest information according to an exemplary embodiment of this disclosure.

FIG. 4 illustrates steps of a process 200 performed for capture of the manifest data by the system 10 in one embodiment. The process is explained in the context of live streaming of multimedia content such as video of a live music concert, although the process is equally applicable to other contexts, such as restreaming or retransmission or other means of providing access to any kind of information content obtained from an earlier live or non-live streaming or transmission or by other means.

The system first obtains and stores the manifest data during an initial stream (e.g., a live stream). The manifest data 42 typically includes one or more addresses, such as a uniform resource identifier (URI), where each address indicates a location from which the one or more stream segments 44 can be accessed. Each address may provide a location for some or a portion of alternative encodings for a segment, e.g. segments comprising the same media content encoded according to one or more attributes or characteristics (e.g., different bitrates or resolutions) for a short interval of the content stream.

For an initial stream, the manifest data 42 generated by the computer system 40 will change as the content stream progresses. As the media content becomes available, e.g. as a live video feed from an event is received, the media content is encoded into the content stream segments 44 by the computer system 40 and stored ready for streaming. The manifest data 42 is constructed on-the-fly (e.g., as the media content becomes available) by the computer system 40, for example being stored in a manifest file which is updated by appending new segment information for newly created segments as the content stream progresses. The manifest data 42 may also be updated by removing segment information from a manifest file for older segments which have already been streamed, after a delay sufficient to ensure that any clients playing the content stream have already accessed (e.g., downloaded) the segments to be removed from the manifest file.

To capture the content stream, new versions of the manifest data are thus accessed periodically, e.g. by accessing an updated manifest file from the system 10 as the transmission proceeds. At step 210, the system 10 accesses (e.g., downloads or retrieves) the currently existing manifest data 42 from the content stream server 40, associates a time-stamp with the obtained manifest data file in step 220, the time stamp being indicative of the time of obtaining the associated manifest data. Each accessed (e.g., downloaded) copy of the manifest data 42 is referred to herein as a captured manifest file, each captured manifest file relating to a time slice of the content stream transmission.

Figure 5:
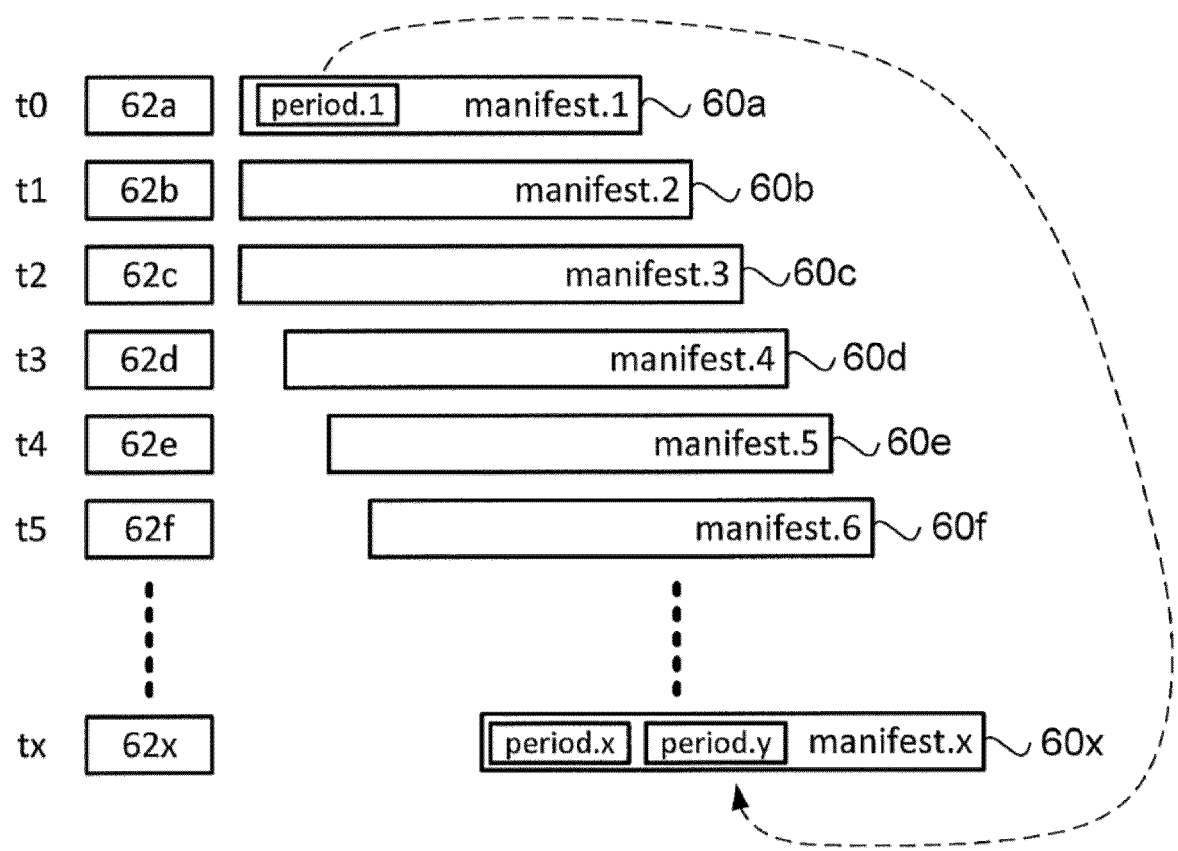
FIG. 5 shows an example of the capture of manifest data in an embodiment of the disclosure.

The system 10 stores the captured manifest data and the associated time-stamp in step 230 as a manifest file 60*a* (e.g., a first captured manifest file) with time-stamp 62*a*. shown in FIG. 5. If the content stream capture period has not ended (step 240), the system 10 may optionally wait for a certain time period, e.g. a predetermined delay period, as indicated in step 250, and then repeats the process, by again accessing copy of the manifest data 42 from the content stream server 40, time-stamping the next manifest file, and storing that next manifest file and the associated time-stamp in step 230 as a subsequent manifest file 60*b* (e.g., second captured manifest file) with time-stamp 62*b*, see FIG. 5. This process is repeated until the content stream transmission has ended, or the stream capture period has ended, or the available storage in the system 10 is full, or some other event occurs. The attribute (e.g., name) of each captured manifest file is preferably modified or associated with sequence information to indicate a position in the sequence of capturing the manifest data. This enables the system 10 to facilitate later redistributing (e.g., restreaming) each of the manifest files according to the sequence, e.g. manifest.1, manifest.2 etc.

FIG. 5 illustrates one example of the capture of manifest data 42 by the system 10. The manifest data 42 is accessed at times t0, t1, t2 etc. during the transmission of the content stream. In this example, a manifest file 60*a*, 60*b*, 60*c*, etc. is obtained from the computer system 40 at each time t0, t1, t2, etc, respectively. In this example, the captured manifest files 60*a*, 60*b*, 60*c* etc. are renamed manifest.1, manifest.2, manifest.3, etc. to indicate the sequence of obtaining the manifest data in each file, and saved with an associated time-stamp 62*a*, 62*b*, 62*c*, etc, respectively. In this way, each copy or instance of the manifest data 42 in the sequence is accessible from the computer system 40 and time-stamped to enable the system 10 to progressively obtain all of the manifest information for re-transmission of an entire or portion of a stream during the capture period to enable later recreation of the stream from the manifest files and referenced segments as originally transmitted.

Figure 6:
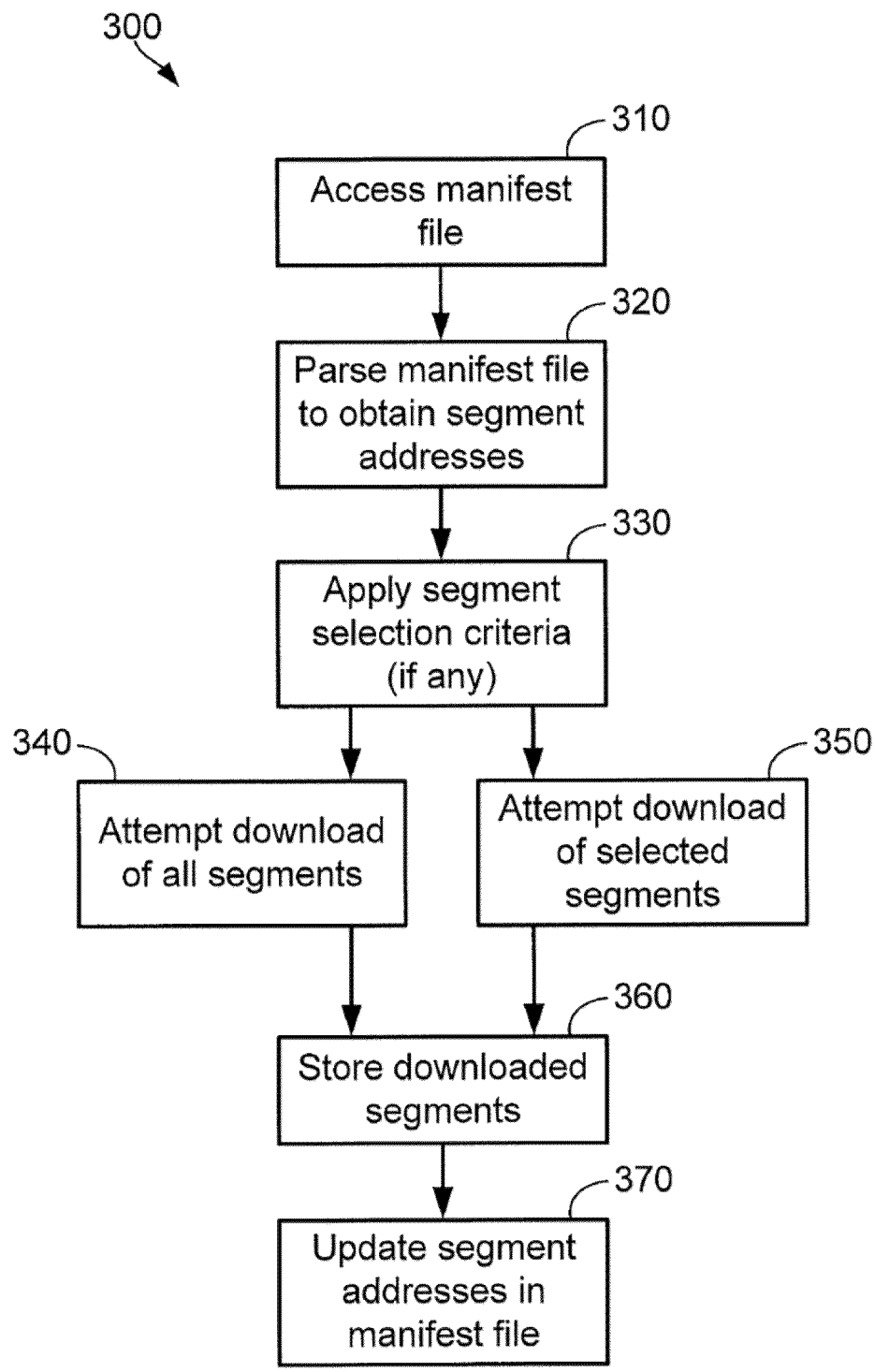
FIG. 6 shows a flow diagram of a method for capture of segments containing the content of a content stream transmission according to an exemplary embodiment of this disclosure.

FIG. 6 illustrates steps of a process 300 performed by the system 10 for processing captured segments containing the content of the transmission in one embodiment.

As the manifest data 42 is periodically accessed (e.g., downloaded or retrieved), the system 10 accesses each new captured manifest file (step 310) and parses the manifest file (step 320) to extract the segment addresses from the manifest data, to enable the system 10 to download the referenced live stream segments from the content stream server 40.

The system 10 may apply selection criteria to select which segments to access (e.g., download or retrieve) from the computer system 40 (step 330). In one embodiment, all of the alternative segments for each interval of playback time are accessed (e.g., downloaded or retrieved) by the system 10 (step 340). This results in the system obtaining the complete set of segments generated by the content stream server 40 for all bit rates or resolutions for the capture period. However, it may be desired to limit the set of segments downloaded to limit the amount of storage required in the system to store the captured segments. A limited download can be achieved, for example, by selecting the alternative segments to be downloaded according to predetermined selection criteria (step 350). Various selection criteria may be used, such as not accessing (e.g., downloading) the alternative segments encoded at the highest bit rate or resolution or at a bit rate or resolution above a certain predetermined threshold, accessing (e.g., downloading) selected parts or elements of the content stream, etc.

The segments that are accessed (e.g., downloaded) and stored in the system 10 (step 360), or they may be stored in a separate storage system from which they can be accessed later when needed.

The system 10 updates the captured manifest files to amend the segment addresses to refer to the new storage location of the captured segments (step 370), i.e. the addresses from which the captured segments can be downloaded. Where the segment addresses in the manifest file 42 are relative addresses, this may be efficiently accomplished by amending the base address to point to the new storage location of the captured segments while preserving the individual relative addresses of each captured segment. If absolute addresses were used, then these may be modified to point to the new storage locations of the captured segments, or preferably may be modified to be relative addresses, to enable the storage locations to be changed as needed at any future time.

The process 300 described with reference to FIG. 6 can run in parallel with the manifest file capture process 200 described with reference to FIG. 4. The download and storage of the stream segments and editing of the segment addresses in the captured manifest file may be performed as each new copy of the manifest data 42 is accessed (e.g., downloaded), or may be performed after some delay by accessing the stored captured manifest files. However, accessing the content stream segments 44 referenced in each captured manifest file may be attempted by the system 10 during the availability period of the relevant segments, to avoid that the system 10 attempts to access segments before they are available to be accessed from the content stream server 40 or after they have become unavailable on the content stream server 40.

For a live stream, the segments typically have different availability times, which indicate the earliest and latest times at which a segment can be downloaded without receiving an error response. As a live stream proceeds, the live edge (the latest edge of the live stream) moves forward in time with the current wall-clock time. The segments at the live edge cannot be downloaded and played as the server is still recording these segments. The latest segments that can be reliably obtained can be determined by backing up from the live edge up by one segment size (e.g. by the maximum segment size), and by also taking account of the time needed by the server to update the manifest file to include references to the latest segments, and network delays in accessing the segments. The content stream server 40 will record and store (e.g., save) the segments 44 as the streamed event occurs, but the segments may be available for a limited time window. This can occur, for example, because segments are deleted after a predetermined amount of time (e.g. after 10 minutes) to free up storage space on the content stream server 40 for new segments.

The manifest data 42 may include an availability attribute which defines which segments can be downloaded from the server, and the system 10 may use this attribute to select segments for downloading. For example, the manifest file may specify a moving window of availability around the live edge, by specifying e.g. a range of segment presentation times between the live edge and 10 minutes before that. However, the manifest file may list more or fewer segments than the availability window. If it lists more, the extra segments may already be unavailable when the manifest is downloaded; if the manifest lists less segments, then they may not fill the whole availability window, but the client may still be able to download the segments even if they are no longer listed in the manifest file if the segments fall inside the availability window.

Figure 7:
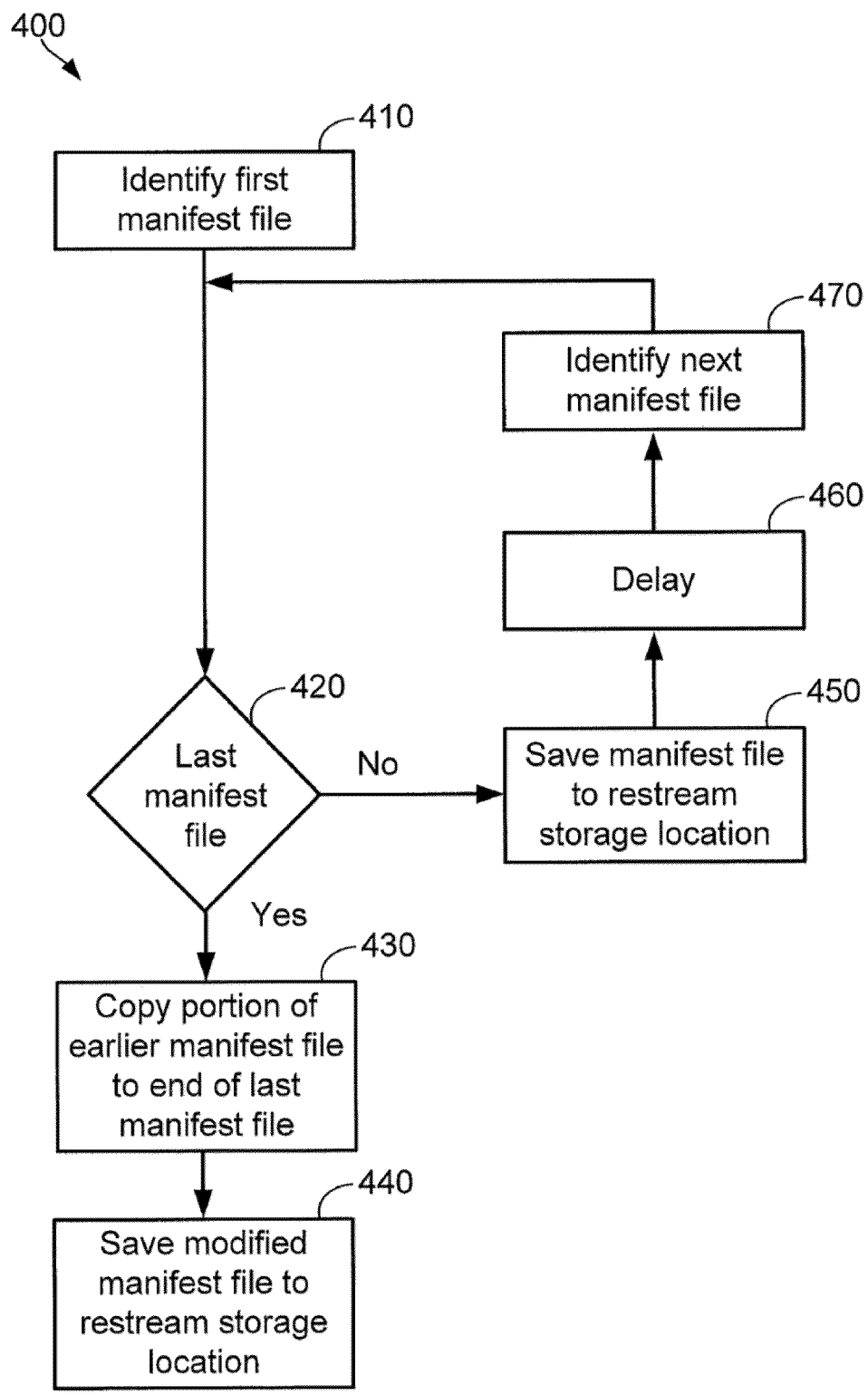
FIG. 7 shows a flow diagram of a method for re-streaming captured manifest files and captured segments according to an exemplary embodiment of this disclosure.

The system 10 is also configured to recreate the captured live stream transmission using the captured manifest files with their associated time-stamps and the captured segments. FIG. 7 illustrates steps of a process 400 performed by the system 10 for distribution of a new stream (e.g., retransmission) based on the captured manifest files and captured segments in one embodiment.

The captured manifest files can be sorted according to their associated time-stamps into a sequential set of manifest files in the order in which they were downloaded during the live stream. In step 410, a first captured manifest file is identified. Note that, although the process 400 shown in FIG. 7 begins with the first captured manifest file, the process 400 could begin with any other of the captured manifest files to enable the system 10 to begin retransmission of the captured live stream from any point within the capture period.

If it is determined in step 420 that the manifest file being processed (i.e. the first captured manifest file or one of the following next captured manifest files) is not the last one, then in step 450 the manifest file is associated with a new attribute (e.g. renamed as the restream manifest file, to provide a manifest file name expected by a client) and stored (e.g., copied or saved) to a storage location in the server 10 (or to a separate storage location in another server), illustrated as the restream manifest file storage unit 22 in FIG. 1, from which the client 50 can access and download the manifest file.

The system 10 may optionally be configured to then wait for a certain time period, e.g. a predetermined delay period (step 460), which may be determined from the availability period of the manifest data, and then identifies the next captured manifest file according to the sequence indicated by associated time-stamps and the process in steps 450 to 470 is repeated until the last captured manifest file is processed.

If it is determined in step 420 that the manifest file being processed is the last one, the system 10 modifies the manifest file to enable 'looping' of the re-streamed transmission. This may be accomplished as shown in step 430, by copying a first portion of the first captured manifest file (or any captured manifest file earlier than the last one) and inserting it as an end portion of the last captured manifest file (note that if there is one captured manifest file, the first captured manifest file will also be the last one). For example, where the content stream is encoded using MPEG-DASH, the first Period of the first captured manifest file may be copied and inserted into the last captured manifest file as the last Period. Where the manifest file includes a single Period, this Period may be copied to create an identical second Period in the manifest file. The Period ID of the copied Period is also changed to make it different to the first Period and may indicate that the copied Period is a second, third or fourth Period etc. as the case may be, or to indicate the next upcoming Period. This is illustrated in FIG. 5, which illustrates one example of the capture of manifest data 42 by the system 10. In this example, the Period "period.1" in the first captured manifest file 60a is copied and saved as a renamed second Period "period.y" into the last captured manifest file 60x.

As an alternative to storing a first or earlier Period, the time periods (e.g. the time-stamps) in the captured manifest files and segments may be modified so the first (or earlier) manifest file follows the last captured manifest file in time to enable 'looping' of the re-streamed transmission. This alternative would require additional processing to restream the transmission, e.g. additional processing to recreate each of the segments with new timestamps. If the stream was encrypted, this would also require access to the encryption keys used to encrypt the content stream to enable each segment to be decrypted, modified, and re-encrypted.

The above-described procedures enable the client 50, during re-streaming of the captured content stream, to play the last segments of the captured content stream and then seamlessly loop to begin playing earlier segments of the captured stream. This looping facility may be useful for some content streams which are not designed to handle discontinuities for a stream that is live, such as an MPEG-DASH live stream with a single Period. Generating a stream that can represent a loop of live content may also be desirable for some applications such as testing or debugging where a live stream which is continuously running for an extended period is necessary.

The modified manifest file is then associated with a new attribute (e.g., a new name) as the restream manifest file (e.g. to a manifest file name expected by a live stream client) and saved to a storage location in the server 10 (or to a separate storage location in another server), illustrated as the restream manifest file storage unit 22 in FIG. 3, from which the live stream client can access and download the manifest file (step 440).

The procedure described above and shown in FIG. 7 results in recreating the content stream transmission by presenting the captured manifest files in sequence to the client 50, by storing (e.g., saving) in turn each of the captured manifest files to a location for download by the client, where the storing is timed to replicate the captured live stream transmission so that the client 50 can re-stream the captured content stream. This restream manifest file downloaded by the client 50 is thus edited on-the-fly as the retransmission of the content stream progresses, effectively recreating the same conditions as the original content stream transmission.

Alternatively, the captured manifest files may be combined into one or more larger manifest files, for example by copying the manifest information from all of the captured manifest into a single manifest file, renaming and storing the combined manifest file in a storage location from which the live stream client can access and download the manifest file to re-stream the captured live broadcast.

The system 10 may optionally create new representations that were not in the original capture, e.g. by transcoding the media content in the captured segments at different bitrates or resolutions than in the captured segments, either before re-transmission or on-the-fly during re-transmission. This could be used to enable testing different bitrates or resolutions or for testing various types of codecs, e.g. transcoding a multiple H.264 content stream at the same quality but lower bitrate for testing an H.265 or VP9 codec.

One or more embodiments of the disclosure may be implemented as a computer program product for use with a computer system. The program(s) of the program product may define functions of the embodiments (including the methods described herein) and can be contained on a variety of computer-readable storage media. The computer-readable storage media may be non-transitory storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information may be permanently stored; and (ii) writable storage media (e.g., hard disk drive or any type of solid-state random-access semiconductor memory, flash memory) on which alterable information may be stored.

The invention claimed is:

1. A method of providing a stream of content based on capturing an initial delivery of the stream, the method comprising:
    obtaining manifest data related to an initial delivery of a stream of content, the manifest data being obtained one or more times in a sequence during the initial delivery of the stream of content to generate one or more manifest files;
    associating a respective time-stamp with each of the one or more manifest files, each of the respective time-stamps being indicative of a time of obtaining a respective one of the one or more manifest files;
    processing each of the one or more manifest files to identify one or more addresses referenced in the one or more manifest files, wherein the one or more addresses reference one or more segments, each of the one or more segments comprising a portion of the stream of content in the initial delivery;
    accessing the one or more segments referenced by the one or more addresses identified in the one or more manifest files;
    modifying a last manifest file of the one or more manifest files to include at least a portion of an earlier manifest file of the one or more manifest files; and
    providing a client with access to the one or more manifest files including the modified last manifest file and the accessed one or more segments, thereby enabling the client to receive at least a portion of the stream of content.

2. The method according to claim 1, further comprising: storing each of the one or more manifest files to a location enabling the client to access the stream for presentation of the content.

3. The method according to claim 1, wherein any second or later obtained manifest files are obtained after expiration of at least a predetermined time delay, wherein the predetermined time delay is a delay from a time of obtaining a last previously obtained manifest file.

4. The method according to claim 1, further comprising attempting to access all of the one or more segments referenced by the one or more addresses.

5. The method according to claim 1, further comprising attempt to access all of the one or more segments that meet a predetermined criteria.

6. The method according to claim 1, further comprising: storing the accessed one or more segments; and editing one or more of the one or more manifest files to refer to one or more new addresses of the stored one or more segments.

7. The method according to claim 1, wherein modifying the last manifest file comprises copying a first period from a first manifest file and inserting the copied period as a second or later period of the last manifest file.

8. The method according to claim 1, further comprising: processing each of the one or more manifest files to identify an availability time for each of the one or more segments; and attempting access of the one or more segments before expiration of the availability time of the respective segments.

9. The method according to claim 1, wherein the each of the one or more segments has an associated availability period, and wherein the processing of each of the manifest files is performed during the availability period of the respective segment.

10. The method according to claim 1, further comprising: editing the one or more manifest files to change one or more availability time indications in the one or more manifest files.

11. The method according to claim 1, further comprising: storing each of the one or more manifest files including a respective associated time-stamp.

12. The method according to claim 1, further comprising: recreating the content stream using the one or more manifest files, the associated time stamps, and the one or more segments.

13. The method according to claim 1, further comprising: sorting the one or more manifest files according to their associated time-stamps into a sequential set of manifest files.

14. The method according to claim 1, further comprising: while capturing, progressively obtaining all of the one or more manifest files for retransmission of a portion of a stream of content; and later recreating the stream of content.

15. A system for providing a content stream based on capturing an earlier transmission of the content stream, the system comprising:
    one or more processors; and
    memory accessible by the one or more processors, the memory storing instructions, which upon execution of the one or more instructions, causes the processors to perform operations to:
        obtain manifest data related to an initial delivery of a stream of content, the manifest data being obtained one or more times in a sequence during the initial delivery of the stream of content to generate one or more manifest files;

associate a respective time-stamp with each of the one or more manifest files, each of the respective time-stamps being indicative of a time of obtaining a respective one of the one or more manifest files;

process each of the one or more manifest files to identify one or more addresses referenced in the one or more manifest files, wherein the one or more addresses reference one or more segments, each of the one or more segments comprising a portion of the stream of content in the initial delivery;

access one or more of the one or more segments referenced by the one or more addresses identified in the one or more manifest files; and modify a last manifest file of the one or more manifest files to include at least a portion of an earlier manifest file of the one or more manifest files;

wherein the system is adapted to provide a client with access to the one or more manifest files including the modified last manifest file and the accessed one or more segments, thereby enabling the client to receive at least a portion of the stream of content.

16. The system according to claim 15, wherein the system is further adapted to store each of the one or more manifest files to a respective location for access by the client to enable the client to play the content stream.

17. The system according to claim 15, wherein any second or later obtained manifest files are obtained after expiration of at least a predetermined time delay, wherein the predetermined time delay is a delay from a time of obtaining a last previously obtained manifest file.

18. The system according to claim 15, wherein modifying the last manifest file comprises copying a first period from an earlier manifest file and inserting the copied period as a second or later period of the last copy of the manifest file.

19. The system according to claim 15, further comprising processing each of the one or more manifest files to identify an availability time for each of the one or more segments, and attempting access of the one or more segments before expiration of an availability time of the respective segments.

20. The system according to claim 15, further comprising:
sorting the one or more manifest files according to their time-stamps into a sequential set of manifest files.

* * * * *